United States Patent
Pal et al.

(10) Patent No.: US 11,907,249 B2
(45) Date of Patent: Feb. 20, 2024

(54) STITCHING DATA FOR ANALYZING REAL TIME SYSTEMS

(71) Applicant: Infinera Corp., San Jose, CA (US)

(72) Inventors: Madhumita Pal, San Jose, CA (US); Dale Chin, San Jose, CA (US); Ramanujan Puranam, San Jose, CA (US); Madhura Joshi, Fremont, CA (US)

(73) Assignee: Infinera Corporation, San Jose, CA (US)

(\*) Notice: Subject to any disclaimer, the term of this patent is extended or adjusted under 35 U.S.C. 154(b) by 0 days.

(21) Appl. No.: 17/841,040

(22) Filed: Jun. 15, 2022

(65) Prior Publication Data

US 2022/0398252 A1 Dec. 15, 2022

Related U.S. Application Data

(60) Provisional application No. 63/210,535, filed on Jun. 15, 2021.

(51) Int. Cl.
*G06F 16/25* (2019.01)
*G06F 16/22* (2019.01)
*H04L 41/22* (2022.01)

(52) U.S. Cl.
CPC ............ *G06F 16/258* (2019.01); *G06F 16/22* (2019.01); *H04L 41/22* (2013.01)

(58) Field of Classification Search
CPC ......... G06F 16/258; G06F 16/22; H04L 41/22
See application file for complete search history.

(56) References Cited

U.S. PATENT DOCUMENTS 5,953,231 A * 9/1999 Miller .................... D05B 19/12
700/143

\* cited by examiner

*Primary Examiner* — Truong V Vo
(74) *Attorney, Agent, or Firm* — David L. Soltz

(57) ABSTRACT

Methods and systems for stitching real-time and historical data are disclosed herein. The data may be gathered from a line card and represent metrics of hardware or software elements of the line card. The historical data may be transferred and stored in an archive of a control card of a network element and the real-time data may be accessed by a proxy host of the control card substantially in real-time. A network administration device may access the historical data on the file collector and/or the real-time data from the proxy host of the control card and convert them to a time series database format and store the converted data in a time series database. A user may access a portion of the converted real-time and/or historical data using a graphical user interface, the accessed portion representing data gathered during a period of time selected by the user.

12 Claims, 5 Drawing Sheets

STITCHING DATA FOR ANALYZING REAL TIME SYSTEMS

CROSS REFERENCE TO RELATED APPLICATION

This application claims the benefit of U.S. Provisional Patent Application No. 63/210,535, which was filed on Jun. 15, 2021, the contents of which are incorporated herein by reference in their entirety.

BACKGROUND

There are two modes of operation when debugging. The first mode is referred to as disconnected debugging and involves a user identifying a problem in their network and sending a log file in for review. A debugger reviews the log file and identifies any issues then informs the user. The second mode is live debugging where the debugger logs into the user's system remotely and views the system operation live to identify any issues.

Currently, debugging real-time optical network elements requires the use of inconsistent/ad-hoc tools. For instance, log files are stored in proprietary storage files that the user is not given access to. If the user has an issue, the user must send the storage file to the manufacturer for analysis. Live debugging, on the other hand, requires a customer to open ports to allow access for a debugger to view system behavior in real-time.

Data in the storage file is currently stored in one format while data for live debugging is provided in a different format. This causes a problem when doing a retrospective analysis and historical data from the storage file must be correlated to live data. Because the data is in different formats, correlating the data is difficult and time consuming.

Therefore, a need exists for systems and methods for collection of live and historical data that may be used for debugging embedded devices that may be stitched together and displayed seamlessly to a debugger in a graphical user interface.

SUMMARY

In one aspect, in accordance with some implementations, the specification describes a system for stitching data may comprise: a network element comprising: a line card having a control plane storing instructions that cause the line card to collect data about hardware or software elements of the line card, the data collected substantially in real-time being a first data and historical data being a second data that is stored; and a control card having a first processor and a first non-transitory computer readable memory storing an archive, a proxy host, and executable code that, when executed, causes the control card to collect the second data from the line card and store the second data in the archive and provide a substantially real-time connection to the first data using the proxy host; a network administration device having a second processor and a second non-transitory computer readable memory storing a time series database and executable code that, when executed, causes the network administration device to retrieve the second data from archive of the control card and connect to the proxy host to receive the first data substantially in real-time and convert the second data and the first data to a set of fixed values and a set of associated dynamic values compatible with the time series database and store the set of fixed values and the set of associated dynamic values in the time series database, the executable code further causing the network administration device to generate a graphical user interface having at least one section configured to display a selected portion of the set of fixed values and the set of associated dynamic values for a user.

The exemplary system for stitching data wherein the selected portion of the set of fixed values and the set of associated dynamic values represents data for a period of time selected by the user using the graphical user interface.

The exemplary system for stitching data, wherein the set of fixed values are labels and the set of associated dynamic values are data points having associated timestamps.

The exemplary system for stitching data, wherein the first data has a first format and the second data has a second format different from the first format and the executable code of the network administration device causes the second processor to convert the first data from the first format to the fixed set of values and the set of associated dynamic values compatible with the time series database and convert the second data from the second format to the fixed set of values and the set of associated dynamic values compatible with the time series database.

The exemplary system for stitching data, wherein the graphical user interface is provided having a first section and a second section, the first section configured to display a first selected portion of the set of fixed values and the set of associated dynamic values, the first selected portion representing a first period of time selected by the user, and the second section configured to display a second selected portion of the set of fixed values and the set of associated dynamic values, the second selected portion representing a second period of time selected by the user.

The exemplary system for stitching data, wherein data associated with the first period of time is historical data and data associated with the second period of time is substantially real-time data.

The exemplary system for stitching data, wherein converting the second data and the first data to the set of fixed values and the set of associated dynamic values compatible with the time series database is done substantially in real-time such that the user can use historical data and substantially real-time data to debug the network element.

In one aspect of the present disclosure, a method of stitching data may comprise: gathering, by a line card of a network element, data representing metrics of hardware or software elements of the line card, data gathered substantially in real-time being a first data and historical data being a second data that is stored; transferring, by the line card of the network element, the second data to a control card of the network element, the second data being stored in an archive of the control card; accessing, by a proxy host of the control card, the first data substantially in real-time; transferring, at a predetermined interval, the second data from the control card to a file collector; accessing, by a network administration device, the second data on the file collector and the first data from the proxy host of the control card; converting, by the network administration device, the second data and the first data to a time series database format and storing the converted first data and the converted second data in a time series database of the network administration device; and displaying a portion of at least one of the converted first data and the converted second data in the graphical user interface on the network administration device, the portion of at least one of the converted first data and the converted second data representing data gathered during a period of time selected by the user.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
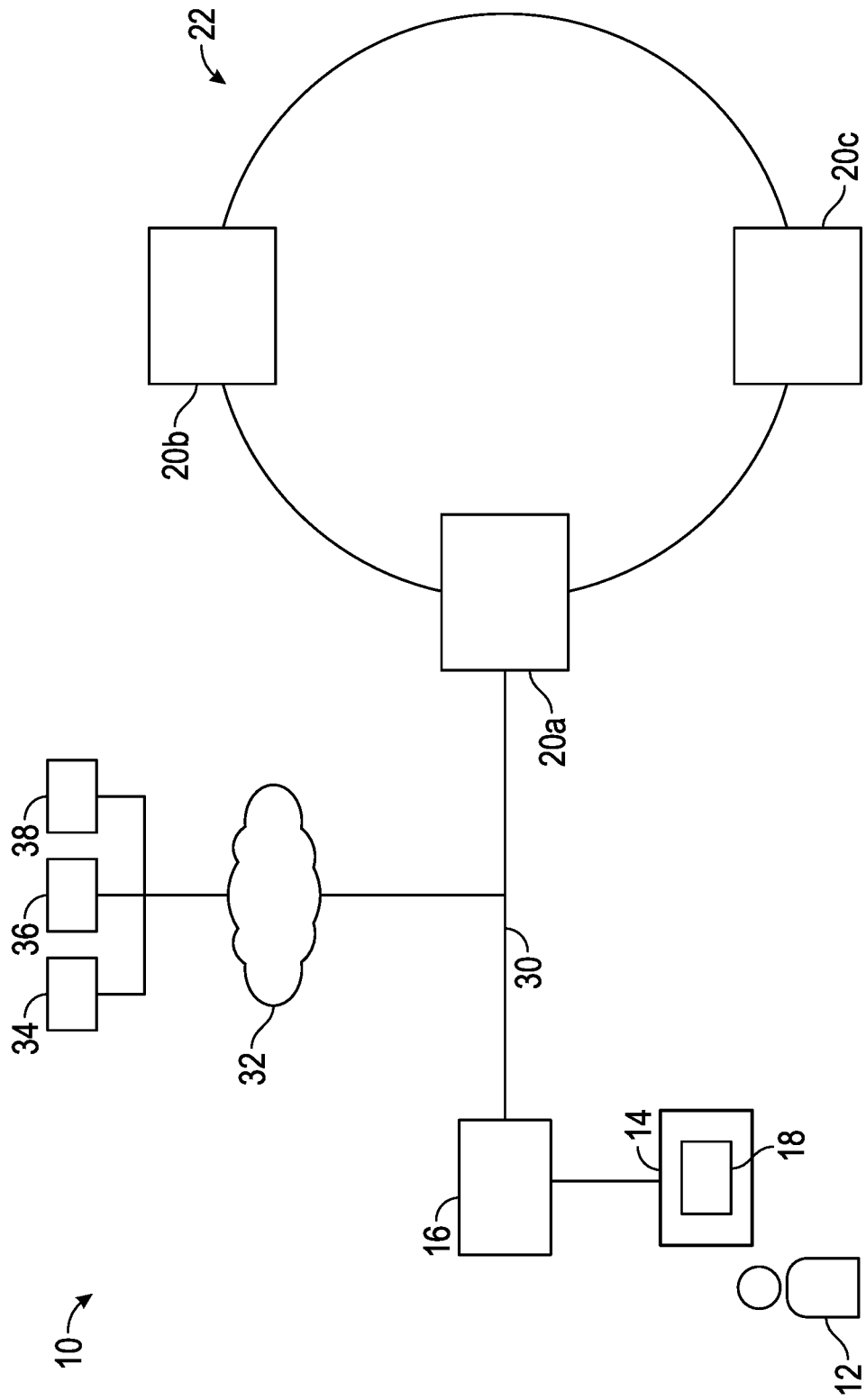
FIG. 1 is a diagrammatic view of hardware forming an exemplary system for stitching data for analyzation and/or debugging constructed in accordance with one embodiment of the present disclosure.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical lightpath. For example, an optical route may specify a path along which light is carried between two or more network entities.

Users of optical networks may want to determine information associated with the optical network. Optical network information may be difficult to obtain, aggregate, and display. Implementations described herein assist a user in obtaining and viewing aggregated optical network information, such as network information associated with network entities and optical links between the network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

FIG. 1 is a diagrammatic view of hardware forming an exemplary system 10 for stitching data for analyzation constructed in accordance with one embodiment of the present disclosure. A user 12 may interact with the system 10 using a user device 14 that may be used to request, from a network administration device 16, a graphical user interface 18 ("GUI 18") that displays analyzation and/or debugging information relating to one or more network elements 20 such as a first node 20a, a second node 20b, and/or a third node 20c of an optical network 22. The network administration device 16 may be connected to the optical network 22 and the user device via a network 30. The network administration device 16 may be connected to a cloud-based server 32 having data collectors such as a node collector 34, a file collector 36, and a network collector 38 that collect data such as metrics, logs, and tracing, for instance, from the network elements 20.

In some embodiments, the cloud-based server 32 may be a data lake that may store copies of data such as sensor data, system data, metrics, logs, tracing, etc. in a raw format as well as transformed data that may be used for tasks such as reporting, visualization, analytics etc. The data lake may include structured data from relational databases, semi-structured data, unstructured data, and binary data. The data lake may be a single-point collector, a cloud-based collector, or a distributed file system.

In some embodiments, the network 30 may be the Internet and/or other network. For example, if the network 30 is the Internet, a primary user interface of the system 10 may be delivered through a series of web pages or private internal web pages of a company or corporation, which may be written in hypertext markup language. It should be noted that the primary user interface of the system 10 may be another type of interface including, but not limited to, a Windows-based application, a tablet-based application, a mobile web interface, an application running on a mobile device, and/or the like.

The network 30 may be almost any type of network. For example, in some embodiments, the network 30 may be a version of an Internet network (e.g., exist in a TCP/IP-based network).

The network administration device 16 may request and/or automatically receive the analyzation and/or debugging information from one or more of the network elements 20 in the optical network 22. The network administration device 16 may receive the analyzation and/or debugging information from the network elements 20, and may provide the requested GUI 18 to the user device 14.

Optical network 22 may include any type of network that uses light as a transmission medium. For example, optical network 22 may include a fiber-optic based network, an optical transport network, a light-emitting diode network, a laser diode network, an infrared network, and/or a combination of these or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination of wired and wireless connections.

Figure 2:
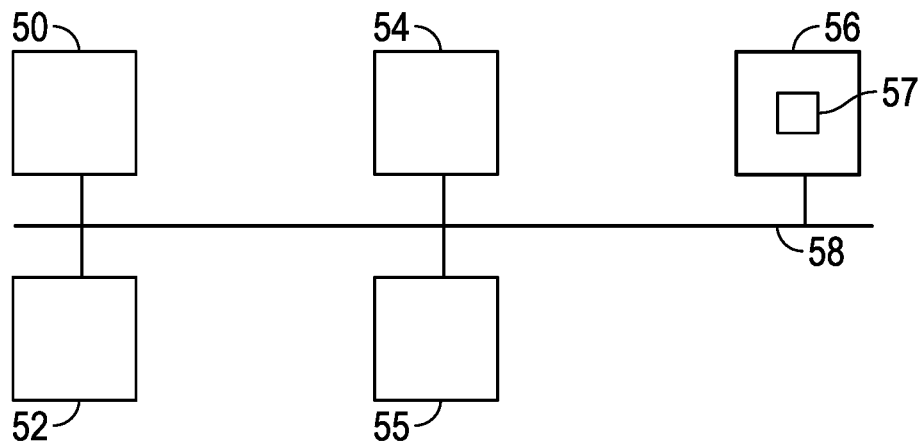
FIG. 2 is a diagrammatic view of an exemplary user device for use in the system for stitching data for analyzation and/or debugging of FIG. 1.

As shown in FIG. 2, the one or more user devices 14 of the system 10 may include, but are not limited to implementation as a personal computer, a cellular telephone, a smart phone, a network-capable television set, a tablet, a laptop computer, a desktop computer, a network-capable handheld device, a server, a digital video recorder, a wearable network-capable device, and/or the like.

In some embodiments, the user device 14 may include one or more input devices 50 (hereinafter "input device 50"), one or more output devices 52 (hereinafter "output device 52"), one or more processors 54 (hereinafter "processor 54"), one or more communication devices 55 (hereinafter "communication device 55") capable of interfacing with the network 30, one or more non-transitory memory 56 (hereinafter "memory 56") storing processor executable code and/or software application(s), for example including, a web browser capable of accessing a website and/or communicating information and/or data over a wireless or wired network (e.g., network 30), and/or the like. The input device 50, output device 52, processor 54, communication device 55, and memory 56 may be connected via a path 58 such as a data bus that permits communication among the components of user device 14.

The memory 56 may store an application 57 that, when executed by the processor 54 causes the user device 14 to display the GUI 18. In some embodiments, the application 57 is programmed to cause the processor 54 to provide the GUI 18 that allows the user 12 to interact with both historical and real-time information gathered from the network elements 20 as will be described further herein.

The input device 50 may be capable of receiving information input from the user 12 and/or processor 54, and transmitting such information to other components of the user device 14 and/or the network 30. The input device 50 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 52 may be capable of outputting information in a form perceivable by the user 12 and/or processor 54. For example, implementations of the output device 52 may include, but are not limited to, a computer monitor, a screen, a touchscreen, a speaker, a web site, a television set, a smart phone, a PDA, a cell phone, a fax machine, a printer, a laptop computer, combinations thereof, and the like, for example. It is to be understood that in some exemplary embodiments, the input device 50 and the output device 52 may be implemented as a single device, such as, for example, a touchscreen of a computer, a tablet, or a smartphone. It is to be further understood that as used herein the term user 12 is not limited to a human being, and may comprise, a computer, a server, a website, a processor, a network interface, a human, a user terminal, a virtual computer, combinations thereof, and/or the like, for example.

The network administration device 16 may be capable of interfacing and/or communicating with the user device 14 via the network 30. For example, the network administration device 16 may be configured to interface by exchanging signals (e.g., analog, digital, optical, and/or the like) via one or more ports (e.g., physical ports or virtual ports) using a network protocol, for example. Additionally, each network administration device 16 may be configured to interface and/or communicate with other network administration devices 16 directly and/or via the network 30, such as by exchanging signals (e.g., analog, digital, optical, and/or the like) via one or more ports.

The network 30 may permit bi-directional communication of information and/or data between the network administration device 16, the user device 14, and/or the network elements 20. The network 30 may interface with the network administration device 16, the user device 14, and/or the network elements 20 in a variety of ways. For example, in some embodiments, the network 30 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 30 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and the like, for example. Additionally, the network 30 may use a variety of network protocols to permit bi-directional interface and/or communication of data and/or information between the network administration device 16, the user device 14 and/or the network elements 20.

Figure 3:
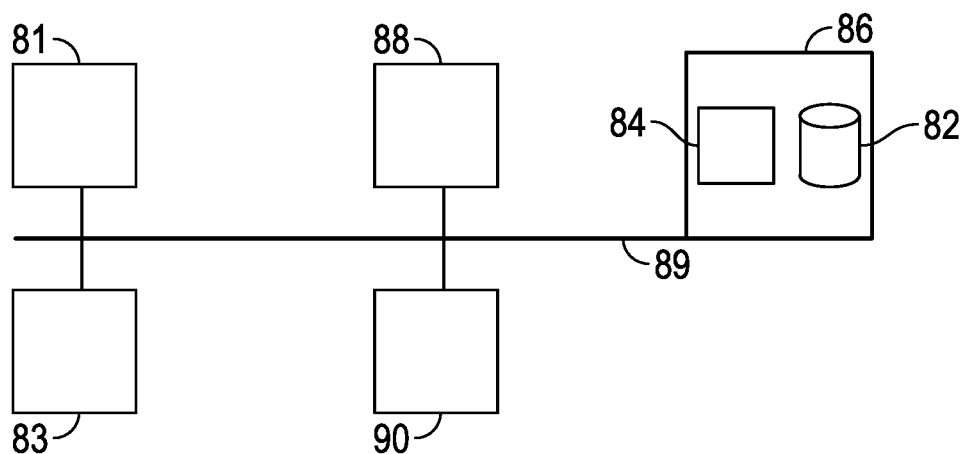
FIG. 3 is a diagrammatic view of an exemplary embodiment of a network administration device for use in the system for stitching data for analyzation and/or debugging of FIG. 1.

Referring now to FIG. 3, shown therein is a diagrammatic view of an exemplary embodiment of the network administration device 16. The network administration device 16 may include one or more devices that gather, process, search, store, and/or provide information in a manner described herein. In the illustrated embodiment, the network administration device 16 is provided with one or more databases 82 (hereinafter "database 82"), program logic 84, and one or more processors 88 (hereinafter "processor 88"). The program logic 84 and the database 82 are stored on non-transitory computer readable storage memory 86 (hereinafter "memory 86") accessible by the processor 88 of the network administration device 16. It should be noted that as used herein, program logic 84 is another term for instructions which can be executed by the processor 24 or the processor 88. In some embodiments, the database 82 may be a time series database. The database 82 may be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 82 can be centralized or distributed across multiple systems.

In some embodiments, the network administration device 16 may comprise one or more processors 88 working together, or independently to, execute processor executable code stored on the memory 86. Additionally, each network administration device 16 may include at least one input device 81 (hereinafter "input device 81") and at least one output device 83 (hereinafter "output device 83"). Each element of the network administration device 16 may be partially or completely network-based or cloud-based, and may or may not be located in a single physical location.

The processor 88 may be implemented as a single processor or multiple processors working together, or independently, to execute the program logic 84 as described herein. It is to be understood, that in certain embodiments using more than one processor 88, the processors 88 may be located remotely from one another, located in the same location, or comprising a unitary multi-core processor. The processors 88 may be capable of reading and/or executing processor executable code and/or capable of creating, manipulating, retrieving, altering, and/or storing data structures into the memory 86.

Exemplary embodiments of the processor 88 may include, but are not limited to, a digital signal processor (DSP), a central processing unit (CPU), a field programmable gate array (FPGA), a microprocessor, a multi-core processor, combinations, thereof, and/or the like, for example. The processor 88 may be capable of communicating with the memory 86 via a path 89 (e.g., data bus). The processor 88 may be capable of communicating with the input device 81 and/or the output device 83.

The processor 88 may be further capable of interfacing and/or communicating with the user device 14 and/or the network elements 20 via the network 30 using the communication device 90. For example, the processor 88 may be capable of communicating via the network 30 by exchanging signals (e.g., analog, digital, optical, and/or the like) via one or more ports (e.g., physical or virtual ports) using a network protocol to provide updated information to the application 57 executed on the user device 14 such as, for instance, historical and/or real-time data displayed to the user 12 in the GUI 18.

The memory 86 may be capable of storing processor executable code such as program logic 84. Additionally, the memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the network administration device 16, and/or one or more memory 86 may be located remotely from the network administration device 16. For example, the memory 86 may be located remotely from the network administration device 16 and communicate with the processor 88 via the network 30. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer readable storage memory (i.e., one or more memory 86 may be partially or completely based on or accessed using the network 30).

The input device 81 of the network administration device 16 may transmit data to the processor 88 and may be similar to the input device 50 of the user device 14. The input device 81 may be located in the same physical location as the processor 88, or located remotely and/or partially or completely network-based. The output device 83 of the network administration device 16 may transmit information from the processor 88 to the user 12, and may be similar to the output device 52 of the user device 14. The output device 83 may be located with the processor 88, or located remotely and/or partially or completely network-based.

The memory 86 may store processor executable code and/or information comprising the database 82 and program logic 84. In some embodiments, the program logic 84 may be stored as a data structure, such as the database 82 and/or data table, for example, or in non-data structure format such as in a non-compiled text file.

Network elements 20 may include one or more devices that gather, process, store, and/or provide information to be displayed on the GUI 18 in a manner described herein. For example, Network elements 20 may include one or more optical data processing and/or traffic transfer devices, such as an optical node, an optical amplifier (e.g., a doped fiber amplifier, an erbium doped fiber amplifier, a Raman amplifier, etc.), an optical add-drop multiplexer ("OADM"), a reconfigurable optical add-drop multiplexer ("ROADM"), a flexibly reconfigurable optical add-drop multiplexer module ("FRM"), an optical source component (e.g., a laser source), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, Network elements 20 may include OADMs and/or ROADMs capable of being configured to add, drop, multiplex, and demultiplex optical signals. Network elements 20 may process and transmit optical signals to other network elements 20 throughout optical network 22 in order to deliver optical transmissions.

Figure 4:
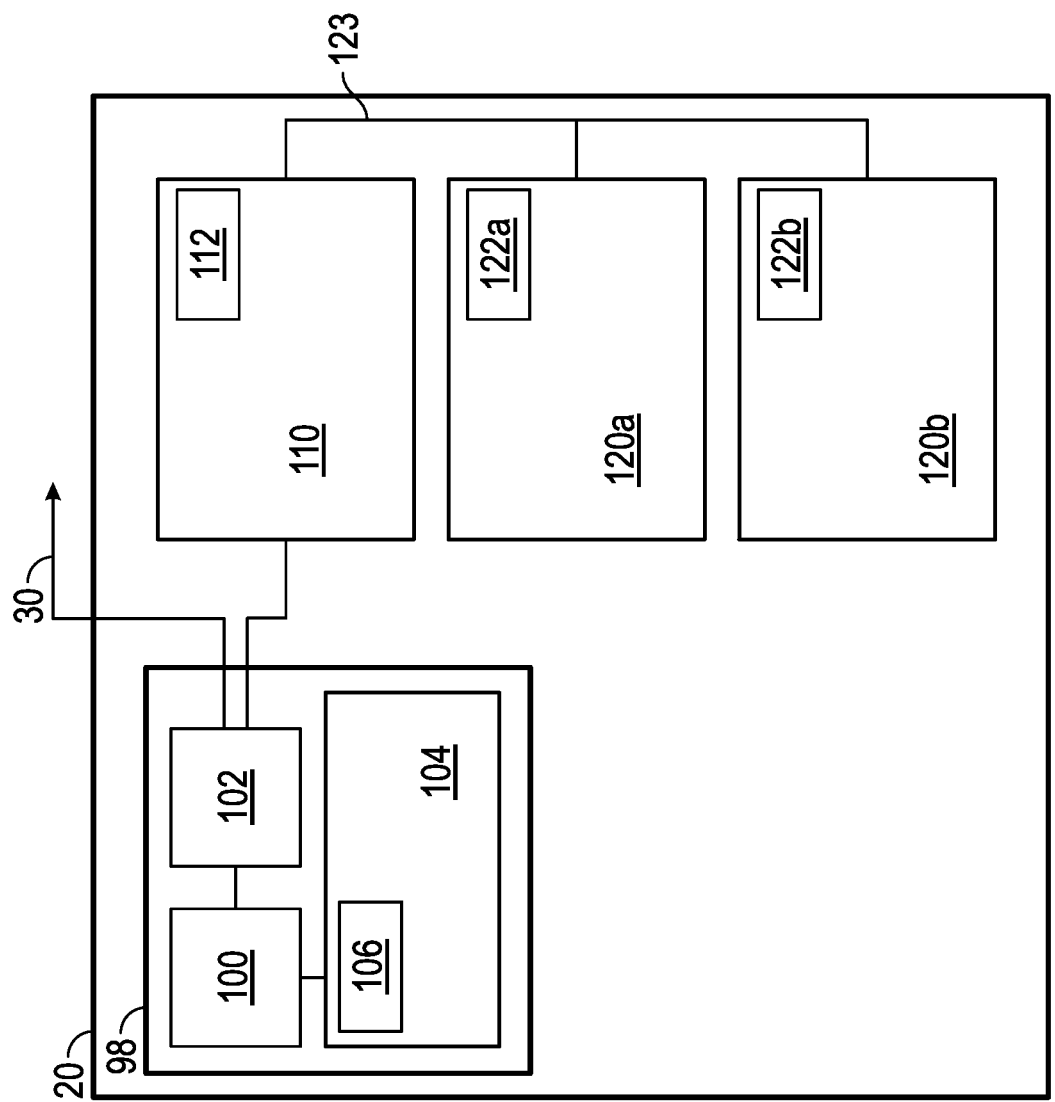
FIG. 4 is a diagrammatic view of an exemplary embodiment of a network element for use in the system for stitching data for analyzation and/or debugging of FIG. 1.

FIG. 4 is a diagrammatic view of an exemplary network element 20 of optical network 22 that may be monitored and/or configured according to implementations described herein. In accordance with the present disclosure, the definition of a network element 20 is broad. For example, a network element 20 may be a holder, like a chassis, or a contained/logical equipment, like an optical line card within the chassis. In one embodiment, the network element 20 may be a logical entity comprising one or more chassis having one or more pluggable cards that form the network element 20. For instance, pluggable cards may include traffic carrying ("data plane") cards that may have customized silicon such as ASICs or FPGAs that process the data plane frames/packets, based on the functionality of the card. Another exemplary traffic carrying card is a router line-card which has packet processing ASICs or other specialized silicon. Another exemplary traffic carrying card 120 is an optical line card that includes a DSP module and/or optical photonic circuits. Pluggable cards may also refer to control cards ("control and management plane") that don't process data packets but run all the software that implement the control plane (routing protocols) and management plane (management interfaces such as CLI, NETCONF, gRPC, DHCP etc.). The control cards typically have an off-the-shelf CPU (such as Intel or ARM) and run some variant of an operating system (more recently, Linux or QNX or BSD). Other common cards may also be added such as fan trays, power entry modules, and others that provide auxiliary functions of the chassis.

As illustrated in FIG. 4, an exemplary network element 20 may be provided with a controller card 98 having a processor 100, a communication device 102, and non-volatile computer readable memory 104 (herein "memory 104") storing an autonomic control plane 106. The network element 20 may also be provided with a chassis controller 110 having a chassis control plane 112, and one or more traffic carrying card 120 such as traffic carrying cards 120a and 120b each having a card control plane 122a and 122b (referred to collectively as "card control plane 122"). The chassis control card 110 and the traffic carrying cards 120a and 120b may be connected via a data path 123 (e.g., data bus).

Layer 1 specific embodiments of network element 20 may optionally be provided with additional elements that are not shown in the Figures such as an optical transceiver, a digital signal processor (DSP), and additional high-speed integrated circuit (ASIC or FPGA) that is specialized to handle high-speed data frames/packets.

Layer 0 specific embodiments of network element 20 may optionally be provided with additional elements that are not shown in the Figures such as a Wavelength Selective Switch (WSS), Variable Optical Attenuator (VOA), Erbium Doped Fiber Amplifier (EDFA), or Raman amplifiers, and optical channel monitors, for instance.

The number of devices illustrated in FIG. 4 is provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Figure 5:
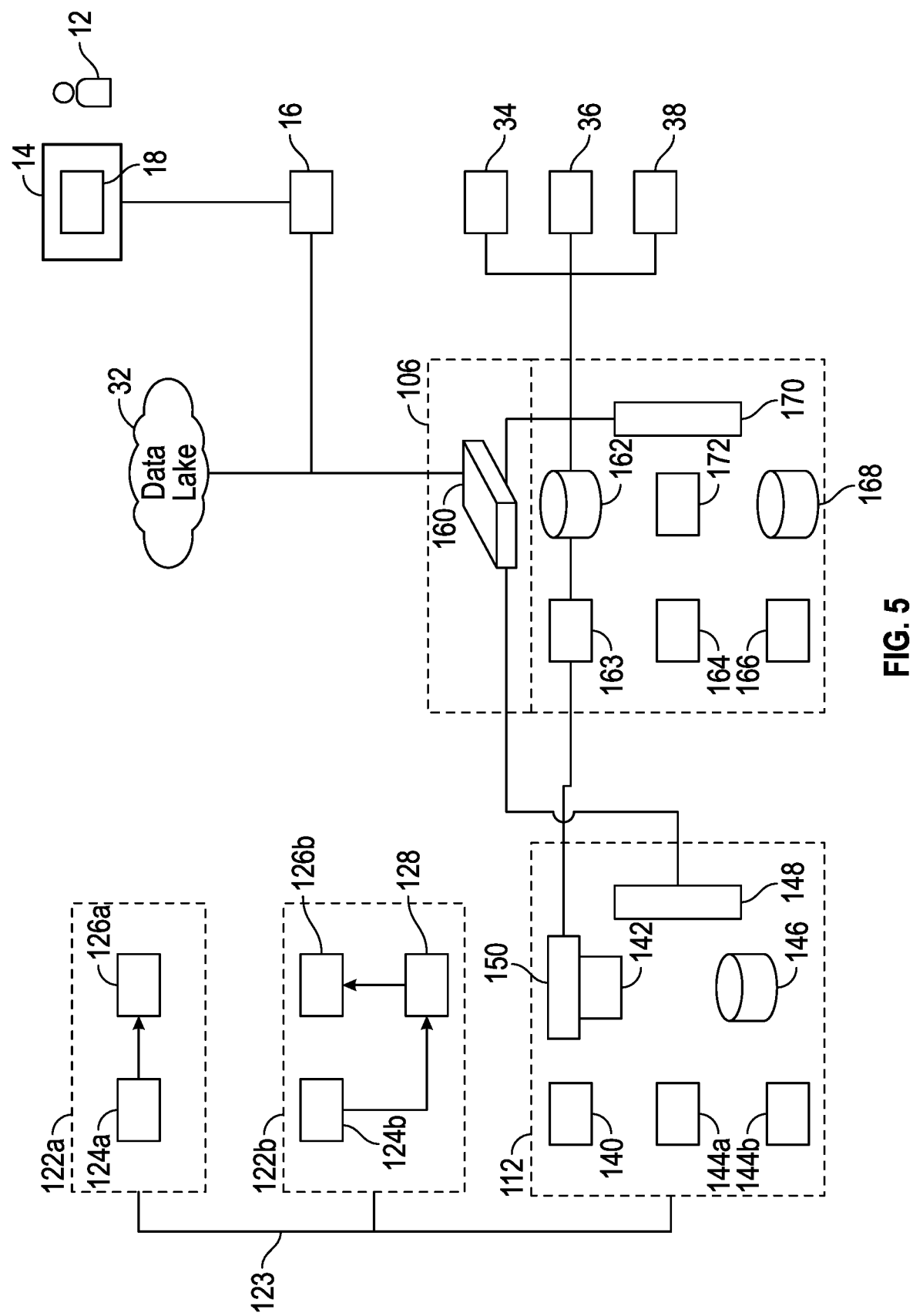
FIG. 5 is a diagrammatic view of exemplary control planes of various elements of the system for stitching data for analyzation and/or debugging of FIG. 1.

FIG. 5 is a diagram of example software components of various elements of the network element 20. Each of the card control planes 122a and 122b of the traffic carrying cards 120a and 120b and the chassis control plane 112 of the chassis controller 110 may be programmed to gather data about hardware and/or software elements of the network element 20 such as sensor data, metrics, logs, tracing, instance domains, instantiated values, and/or semantical metadata. The data may be gathered at regular intervals and stored and/or gathered in substantially real-time and provided to a requesting entity or device such as the control card 98, the network administration device 16, and/or the user device 14 as will be described further herein.

In one embodiment, the card control planes 122a and 122b may be provided with an agent 124a and 124b (referred to collectively as "agent 124") and a collector 126a and 126b (referred to collectively as "collector 126"). The agent 124 may be programmed to gather and provide data to the collector 126 such as data about hardware and/or software elements of the traffic carrying cards 120a and 120b which may include sensor data, metrics, logs, tracing, instance domains, instantiated values, and/or semantical metadata, for instance. The agent 124 may be a process started by the collector 126, an independent process, or a Dynamic Shared Object (DSO) that is attached to the collector's 126 address space. In some embodiments, a separate process, such as daemon 128, may connect the agent 124 to the collector 126 communicating the data, for instance using Performance Data Units (PDU) Inter-Process Communication (IPC) protocol.

The chassis controller 110 may be provided with a chassis agent 140, a chassis collector 142, one or more logger 144a and 144b, a chassis archive 146, a chassis proxy 148, and a debug module 150.

The chassis agent 140 may be programmed to gather data such as sensor data, metrics, logs, tracing, instance domains, instantiated values, and/or semantical metadata and provide the data to the chassis collector 142. In some embodiments, the chassis agent 140 may gather and aggregate data from the chassis controller 110 and the traffic carrying cards 120a and 120b and provide the aggregated data to the chassis collector 142.

The debug module 150 may be programmed to gather and encode debug data from among the data provided by the chassis agent 140 and/or the chassis archive 146 to the chassis collector 142. The debug module 150 may be programmed to provide the debug data automatically at predetermined time periods or on-demand such as during a debug session. The debug data may be considered proprietary data and may be encoded in a format not accessible by the user 12. Further, the debug data for different device manufacturers may be in a different format. The debug data from the chassis controller 110 may be transferred to a debug database 162 of the autonomic control plane 106 of the controller card 98. The debug database 162 may aggregate the debug data of the chassis controller 110 with debug data of the controller card 98. A controller debug module 163 may coordinate transfer of the debug data from the chassis controller 110.

The one or more logger 144a and 144b may be configured to generate archives of data collected such as sensor data, metrics, logs, tracing, instance domains, instantiated values, and/or semantical metadata. The archives of data generated by the one or more logger 144a and 144b may be stored in chassis archive 146 for retrieval at a later time or to be transferred at a predetermined interval to be stored in one or more of the data collectors, such as, the node collector 34, the file collector 36, or the network collector 38.

In one embodiment, logger 144a is a first logger and logger 144b is a second logger and the first logger 144a is programmed to generate archives of data collected from the chassis controller 110 and the second logger 144b may be programmed to generate archives of the data collected from one or more of the traffic carrying cards 120a and 120b. In such an embodiment, the data collected from the chassis controller 110 by the first logger 144a and the data collected from one or more of the traffic carrying cards 120a and 120b by the second logger 144b may be aggregated and stored in the archive 146.

The chassis proxy 148 acts as a protocol proxy that allows a system monitor such as network administration device 16 or cloud-based server 32 to connect to data being collected by the chassis collector 142 or archived in the chassis archive 146 in substantially real-time. In some embodiments, the chassis proxy 148 may connect to a proxy host such as proxy host 160 of the autonomic control plane 106 of the controller card 98 which may, in turn, make the data being collected by the chassis collector 142 or archived in the chassis archive 146 available to system monitors such as network administration device 16 or cloud-based server 32 in substantially real-time.

The autonomic control plane 106 of the controller card 98 may be provided with the proxy host 160, the debug database 162, the controller debug module 163, a controller agent 164, a controller logger 166, a controller archive 168, a controller proxy 170, and a controller collector 172.

The controller agent 164 may be programmed to gather data such as sensor data, metrics, logs, tracing, instance domains, instantiated values, and/or semantical metadata and provide the data to the controller collector 172. In some embodiments, the controller agent 164 may gather and aggregate data from the chassis controller 110.

The controller logger 166 may be configured to generate archives of data collected by the controller agent 164 such as sensor data, metrics, logs, tracing, instance domains, instantiated values, and/or semantical metadata. The archives of data generated by the controller logger 166 may be stored in controller archive 168 for retrieval at a later time or to be transferred to the debug database 162.

The controller proxy 170 acts as a protocol proxy that allows the system monitor such as network administration device 16 or cloud-based server 32 to connect to data being collected by the controller collector 172 or archived in the controller archive 168 in substantially real-time.

The debug data stored in the debug database 162 may be transferred to the data collectors, the node collector 34, file collector 36, and/or network collector 38 via the network 30. The debug data may be transferred on an automatic schedule at predetermined time intervals or on-demand. The debug data may be transferred while connected or disconnected. Disconnected, as used in this context, refers to a state in which the user 12 (a debugger) is not connected to the network element 20 during debugging. Rather, the user 12 debugs the network element 20 using the debug data which represents historical data. When collecting data, a timestamp may be used. The timestamp may be stored associated with debug data, both real-time and historical. When accessing debug data stored in the debug database 162, for instance, the GUI 18 differentiates between the real-time data (data collected in the last five (5) minutes) and historical data (data collected more than five minutes prior to access) using the timestamp. The GUI 18 may be programmed to automatically update real-time information displayed in the GUI 18 at predetermined intervals. For instance, the GUI 18 may be programmed to automatically update the real-time information at intervals between one (1) second and sixty (60) seconds. In some embodiments, the GUI 18 may be provided with a mechanism such as an update button (not shown) that allows the user 12 to updated the information displayed in the GUI 18 by selecting the update button.

Figure 6:
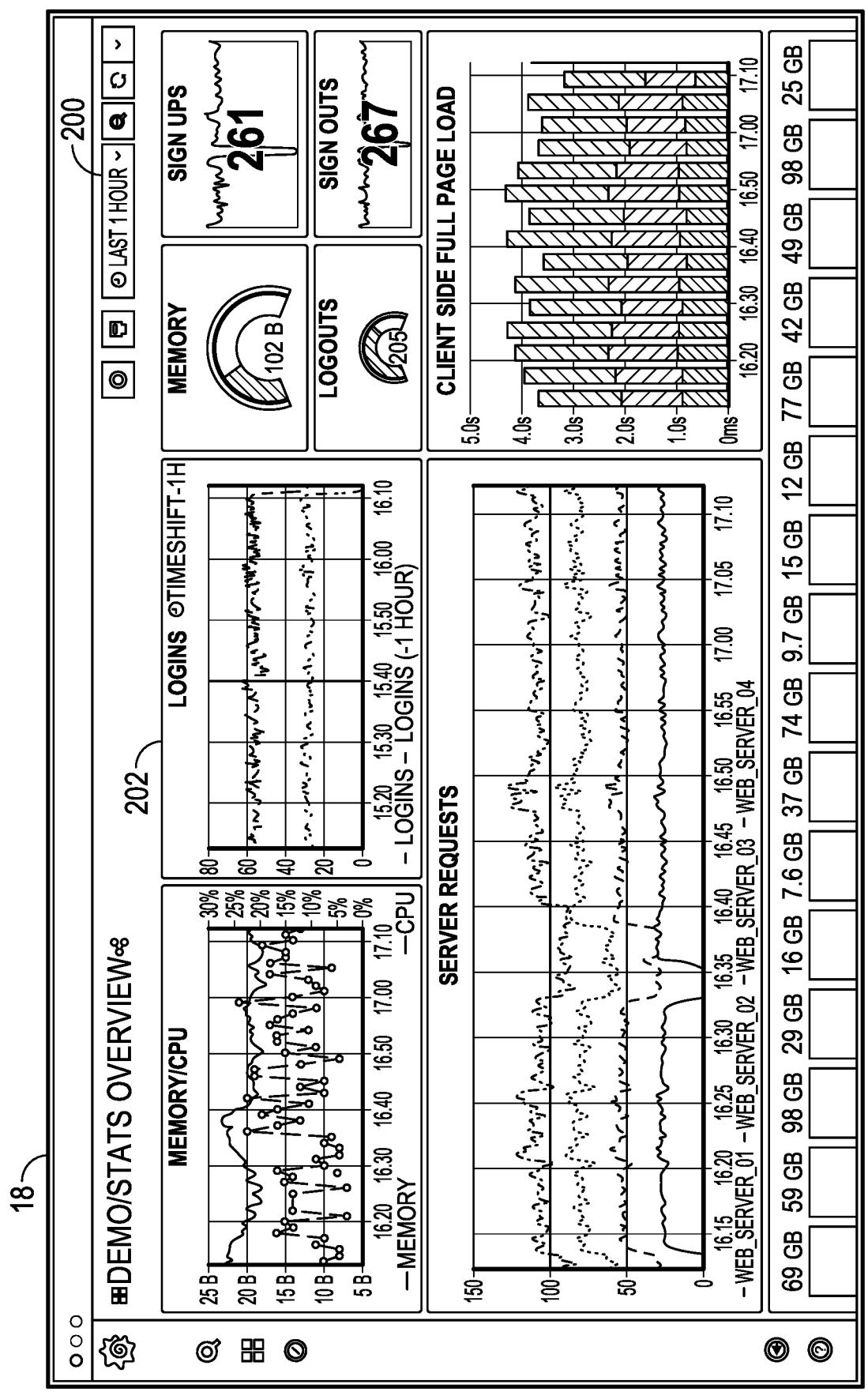
FIG. 6 is an exemplary graphical user interface constructed in accordance with one embodiment of the present disclosure.

Referring now to FIG. 6, an embodiment of the GUI 18 as it may be displayed on the user device 14, for instance, is illustrated. The user 12 may interact with the GUI 18 via different input mechanisms. For example, a user may select different tabs or modules to change the displayed information on the GUI. The user may select different columns and/or cells in displayed tables to change the displayed information on the GUI. The user may change the displayed information by selecting a view (e.g., from a drop-down box and/or a drop-down menu). The user may select different options to change the displayed information on the GUI. Additionally, or alternatively, the user may select other elements displayed on the GUI to change the displayed information on the GUI. In some implementations, a user may change a configuration and/or a parameter associated with a network entity by interacting with the GUI 18.

The information displayed in the GUI 18 may be an aggregation of historical data (archived or debug data recorded in the past) and substantially real-time data formatted for easy viewing by the user 12. Because the debug data and the real-time data may be in different formats, the program logic 84 of the network administration device 16 is programmed to convert the debug data and the real-time data to a time series database format and insert the time-series debug data and the real-time data into the database 82. This way, the user 12 may review both real-time and historical data in the GUI 18 seamlessly. This allows the user 12 to debug the network element 20 without having to go through the painstaking process of separately reviewing and/or converting data in different formats to debug the network element 20.

The GUI 18 may be provided with a selectable element 200 configured to allow the user 12 to select a time period for viewing historical and/or substantially real-time data that has been converted to time series data in one or more sections 202 (only one of which is numbered in FIG. 6) of the GUI 18. In some embodiments, the GUI 18 may be provided with more than one selectable element similar to selectable element 200 that allow the user 12 to select more than one period of time that may be displayed in more than one of the sections 202 of the GUI 18. For instance, the user 12 may want to view historical data in one section 202 and substantially real-time data in another section 202 of the GUI 18 to debug the network element 20. Because the historical data and substantially real-time data are converted by the network administration device to the same format (e.g., the time series database format), the experience of the user 12 in viewing the historical data and substantially real-time data in the GUI 18 is seamless, i.e., the historical data and substantially real-time data have the same look and feel to the user 12 viewing the GUI 18.

In some embodiments, converting the historical data and substantially real-time data takes place substantially in real-time after the user requests information regarding a period of time. In other embodiments, conversion of the historical data may be performed when the historical data is transferred for storage in the file collector 36, for instance. In such an embodiment, conversion may be performed by the file collector 36, the cloud-based server 32, or the network administration device 16. Conversion of the substantially in real-time may be performed by the cloud-based server 32 or the network administration device 16.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system for stitching data, comprising:
 a network element comprising:
  a line card having a control plane storing instructions that cause the line card to collect data about hardware or software elements of the line card, the data collected substantially in real-time being a first data and historical data being a second data that is stored; and
  a control card having a first processor and a first non-transitory computer readable memory storing an archive, a proxy host, and executable code that, when executed, causes the control card to collect the second data from the line card and store the second data in the archive and provide a substantially real-time connection to the first data using the proxy host;
 a network administration device having a second processor and a second non-transitory computer readable memory storing a time series database and executable code that, when executed, causes the network administration device to retrieve the second data from archive of the control card and connect to the proxy host to receive the first data substantially in real-time and convert the second data and the first data to a set of fixed values and a set of associated dynamic values compatible with the time series database and store the set of fixed values and the set of associated dynamic values in the time series database, the executable code further causing the network administration device to generate a graphical user interface having at least one section configured to display a selected portion of the set of fixed values and the set of associated dynamic values for a user.

2. The system for stitching data of claim 1, wherein the selected portion of the set of fixed values and the set of associated dynamic values represents data for a period of time selected by the user using the graphical user interface.

3. The system for stitching data of claim 1, wherein the set of fixed values are labels and the set of associated dynamic values are data points having associated timestamps.

4. The system for stitching data of claim 1, wherein the first data has a first format and the second data has a second format different from the first format and the executable code of the network administration device causes the second processor to convert the first data from the first format to the fixed set of values and the set of associated dynamic values compatible with the time series database and convert the second data from the second format to the fixed set of values and the set of associated dynamic values compatible with the time series database.

5. The system for stitching data of claim 4, wherein the graphical user interface is provided having a first section and a second section, the first section configured to display a first selected portion of the set of fixed values and the set of associated dynamic values, the first selected portion representing a first period of time selected by the user, and the second section configured to display a second selected portion of the set of fixed values and the set of associated dynamic values, the second selected portion representing a second period of time selected by the user.

6. The system for stitching data of claim 5, wherein data associated with the first period of time is historical data and data associated with the second period of time is substantially real-time data.

7. The system for stitching data of claim 6, wherein converting the second data and the first data to the set of fixed values and the set of associated dynamic values compatible with the time series database is done substantially in real-time such that the user can use historical data and substantially real-time data to debug the network element.

8. The system for stitching data of claim 1, wherein the second data is retrieved from archive of the control card using a file transfer protocol.

9. The system for stitching data of claim 1, wherein the second data is retrieved from archive of the control card using a disconnected file-based transfer.

10. The system for stitching data of claim 1, wherein the executable code causes the network administration device to retrieve the second data from the archive of the control card at a predetermined interval of time.

11. A method of stitching data, comprising:
gathering, by a line card of a network element, data representing metrics of hardware or software elements of the line card, data gathered substantially in real-time being a first data and historical data being a second data that is stored;
transferring, by the line card of the network element, the second data to a control card of the network element, the second data being stored in an archive of the control card;
accessing, by a proxy host of the control card, the first data substantially in real-time;
transferring, at a predetermined interval, the second data from the control card to a file collector;
accessing, by a network administration device, the second data on the file collector and the first data from the proxy host of the control card;
converting, by the network administration device, the second data and the first data to a time series database format and storing the converted first data and the converted second data in a time series database of the network administration device; and
displaying a portion of at least one of the converted first data and the converted second data in the graphical user interface on the network administration device, the portion of at least one of the converted first data and the converted second data representing data gathered during a period of time selected by the user.

12. A method of stitching data, in accordance with claim 11, wherein the second data further includes sensor data.

* * * * *